(12) United States Patent
Barthelme et al.

(10) Patent No.: US 11,965,560 B2
(45) Date of Patent: Apr. 23, 2024

(54) BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/746,373

(22) Filed: May 17, 2022

(65) Prior Publication Data

US 2022/0389971 A1    Dec. 8, 2022

(30) Foreign Application Priority Data

Jun. 8, 2021 (DE) .......................... 102021205784.5

(51) Int. Cl.
| | | |
|---|---|---|
| *F16C 41/00* | (2006.01) | |
| *F16C 35/04* | (2006.01) | |
| *F16C 35/07* | (2006.01) | |
| *F16C 35/077* | (2006.01) | |

(52) U.S. Cl.
CPC .......... *F16C 41/002* (2013.01); *F16C 35/077* (2013.01); *F16C 35/045* (2013.01)

(58) Field of Classification Search
CPC .... F16C 35/042; F16C 35/045; F16C 35/047; F16C 35/077; F16C 41/002; H02K 5/173; H02K 5/145

See application file for complete search history.

(56) References Cited

U.S. PATENT DOCUMENTS

| | | | | |
|---|---|---|---|---|
| 5,836,702 A | * | 11/1998 | Whiddon | F16C 35/045 |
| | | | | 384/428 |
| 2002/0130570 A1 | * | 9/2002 | Howe | H02K 5/08 |
| | | | | 310/89 |
| 2015/0156954 A1 | * | 6/2015 | Ciulla | F16C 19/184 |
| | | | | 384/460 |

FOREIGN PATENT DOCUMENTS

| | | | | |
|---|---|---|---|---|
| DE | 102018213672 A1 | * | 2/2020 | ............ F16C 19/163 |
| GB | 2024338 A | * | 1/1980 | ............ F16C 23/084 |

OTHER PUBLICATIONS

Machine Translation of DE-102018213672-A1 (Year: 2020).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing assembly includes a bearing unit configured to support a rotating component relative to a stationary component and having a first stationary bearing ring configured to be connected to the stationary component in a rotationally fixed manner by a bearing carrier and a second rotatable bearing ring configured to be connected to the rotating component. The bearing carrier includes at least one electrical conductor configured to make electrical contact with the bearing unit and to make electrical contact with the stationary component or to be electrically connected to the stationary component when the bearing carrier is mounted to the stationary component.

12 Claims, 3 Drawing Sheets

BEARING ASSEMBLY

CROSS-REFERENCE

This application claims priority to German patent application no. 10 2021 205 784.5 filed on Jun. 8, 2021, the contents of which are fully incorporated herein by reference.

TECHNOLOGICAL FIELD

The present invention relates to a bearing assembly including a bearing carrier having an electrically conductive element.

BACKGROUND

Rolling-element bearings can be used to support rotating components with respect to stationary components, for example as a non-locating or locating bearing for supporting a rotating shaft in a housing. Here the bearing rings are connected to the rotating and the stationary component, e.g., the housing and the shaft, such that this connection remains fixed as constantly as possible under all operating states and environmental conditions of the application.

However, with such bearing assemblies, especially with use in modern electric machines, damaging current can pass through the bearing assembly or the bearing unit. In order to avoid such current flows, ceramic rolling elements can be used, for example, that are non-conductive. However, the manufacturing costs of the bearing assemblies increase due to such rolling elements.

SUMMARY

It is therefore an aspect of the present disclosure to provide a bearing assembly in which damaging current flows through the bearing are prevented and which are simultaneously economical to manufacture and simple to install.

The disclosed bearing assembly includes a bearing unit that is configured to support a rotating component relative to a stationary component. The bearing unit includes a first stationary bearing and a second rotatable bearing ring, wherein the rotatable bearing ring is connectable to the rotating component and wherein the stationary bearing ring is connectable to the stationary component by a bearing carrier such that the stationary bearing ring and the stationary component are fixed against relative rotation.

The bearing assembly can serve both as non-locating bearing and as a locating bearing. With an implementation as a locating bearing, the stationary bearing ring is connected to the stationary component not only such that they are rotationally fixed, but also such that they are axially fixed. With an implementation as a non-locating bearing, the stationary bearing ring is connected to the stationary component such that they are rotationally fixed, but such that the stationary bearing ring is axially displaceable relative to the stationary component in order to be able to compensate for thermal expansion.

In both cases the rotatable bearing ring is fixedly connectable to the rotating component. Such a fixed connectability can be brought about, for example, by snap rings or a press seat.

The stationary component can be, for example, a housing. In order to connect the stationary bearing ring to the housing such that they are rotationally fixed, a bearing carrier can be used. The bearing carrier is fixedly connectable to the housing, and the stationary bearing ring is attached in the bearing carrier essentially such that the stationary bearing ring and the bearing carrier are rotationally fixed, but such that under certain circumstances the stationary bearing ring is axially displaceable. It is advantageous here in particular when the bearing assembly is provided as a preassembled unit made of the bearing carrier and the bearing unit. The entire bearing assembly can thereby easily be attached to the housing without the tolerances of the individual components having to be set separately and laboriously during installation.

In order to avoid damaging current flows through the bearing unit, the bearing carrier includes at least one electrically conducting element. This electrically conducting element can on the one hand provide an electrically conducting contact with the stationary component, and thus serve for current dissipation and grounding, and on the other hand can also prevent the release of electromagnetic emissions of an electric motor.

In order to avoid harmful current flows through the bearing unit, the electrically conducting element can furthermore provide an electrically conducting contact between the bearing unit and the stationary component. Here the electrically conducting element contacts both the stationary component and the bearing unit, for example, on the stationary bearing ring. Due to this contact, an electrically conducting connection is provided between the stationary component and the bearing unit, whereby a grounding of the bearing unit is effected via the stationary component.

The bearing carrier can preferably be formed from a non-conducting material, in particular from thermoplastic and/or from thermoset. This has the advantage that the bearing carrier can be manufactured from a very light material in order to meet increasing requirements for a weight reduction of such bearing assemblies. Since the grounding is effected via the electrically conducting element, the material of the bearing carrier itself need not be conductive.

Thermosets are hard polymer materials that are cross-linked three-dimensionally via chemical primary valency bonds. They provide the advantage that they retain their strength in operation even with heat and have a low thermal expansion, which leads to a high dimensional stability.

Thermoplastics have the advantage that they can be processed at lower temperatures than thermosets, which reduces the negative impacts on the bearing unit that can be caused by high temperatures being used during the manufacture of the bearing carrier.

The bearing carrier can be disposed at least partially on the outer surface or the inner surface of the stationary bearing ring. If it is disposed on the outer surface, the stationary component can be, for example, a housing to which the bearing carrier is connected. If the bearing carrier is disposed on the inner surface of the stationary bearing ring, it can be, for example, a hub to which the bearing carrier is connected.

The stationary component can be connected to the bearing carrier using attachment means, such as, for example, screws. The bearing carrier can in turn be connected to the stationary bearing ring by friction fit, by interference fit, and/or by material bonding.

The electrically conducting element can be molded in the bearing carrier. For example, the bearing carrier can be cast or injected around the electrically conducting element. This means that the electrically conducting element can be embedded in the bearing carrier during the manufacturing process of the bearing carrier so that no separate step is required.

The electrically conducting element can include metal and/or carbon fibers. For example, a plurality of carbon fibers can be molded in the bearing carrier, which carbon fibers make possible a conductive contact between the bearing unit and the stationary component. Alternatively the electrically conducting element can also be present in the form of a film, a metal plate, or a grid that is respectively molded in the bearing carrier.

According to a further embodiment, the electrically conducting element provides a direct conducting contact with the stationary component. In this case the electrically conducting element is disposed such that it provides a direct connection between the bearing unit and the stationary component.

Alternatively the electrically conducting element can also provide an indirect conducting contact with the stationary component via an attachment element. For example, the electrically conducting element can provide a direct contact between the bearing unit and a screw, wherein the screw is in turn connected to the stationary component as attachment element. Here the attachment element should be electrically conducting in order to make possible the conducting contact between the stationary component and the bearing unit via the attachment means and the electrically conducting element.

According to a further embodiment, the electrically conducting element can include at least one attachment element that is configured to attach the bearing carrier to the stationary component. Such an attachment means, for example, a bore, rivet, or thread, can preferably be a direct component of the electrically conducting element, i.e., integrated directly into the electrically conducting element.

According to a further embodiment, the electrically conducting element can be adapted in its shape to the contact between the bearing unit and the stationary component. This means that the shape of the electrically conducting element can be differently shaped or curved, depending on whether there is an indirect conducting contact via an attachment element or a direct conducting contact with the stationary component, in order to make possible the corresponding contacting. Here the electrically conducting element can be configured as a disk, can have a step shape or bowl shape, or can have other curvatures in order to respectively make possible the contacting.

The electrically conducting element is preferably not formed over the entire circumference of the bearing carrier, but rather extends only in a limited section of the circumference.

According to a further embodiment, the electrically conducting element is disposed on the outside of the bearing carrier and includes a contact element for direct contacting of the stationary component. In this embodiment, the electrically conducting element is not molded in the bearing carrier, but rather is attached to an outer surface of the bearing carrier, for example, by overmolding, vapor deposition, adhering, pressing, coating, etc. The electrically conducting element can have the form of a cover, a ring, a sleeve, etc., which is respectively pressed, snapped, or adhered on/in the bearing carrier, or welded or soldered thereto. The electrically conducting element can also be constructed and applied in layers, for example, by a 3D printing method.

Furthermore, the electrically conducting element can be applied onto the bearing carrier and connected to the bearing carrier by a coating method. In this case the electrically conducting element forms a conducting layer applied onto the surface of the bearing carrier.

The use of a separate electrically conducting element that is disposed on the surface of the bearing carrier has the advantage that the electrically conducting element can also be applied onto the bearing carrier retroactively in a particularly simple manner. In order to contact the stationary component, the electrically conducting element can in this case include a contact element that makes possible a direct contact with the stationary component.

According to a further embodiment, the bearing carrier includes a threaded insert for connecting to the stationary component, and the electrically conducting element provides a contact between the stationary component and the bearing unit via the threaded insert. This has the advantage that the bearing unit and the stationary component are contacted from the side of the bearing carrier via a threaded insert into which a screw or a thread can be screwed from the other side of the stationary component. In this case the electrical contacting is thus effected via the electrically conducting element, the threaded insert, as well as the attachment means in the stationary component.

According to another embodiment, a bearing assembly includes a bearing unit configured to support a rotating component relative to a stationary component and having a first stationary bearing ring configured to be connected to the stationary component in a rotationally fixed manner by a bearing carrier and a second rotatable bearing ring configured to be connected to a rotating component. The bearing carrier includes at least one electrical conductor configured to make electrical contact with the bearing unit and to make electrical contact with the stationary component or to be electrically connected to the stationary component when the bearing carrier is mounted to the stationary component.

According to a further embodiment, a bearing assembly includes a bearing unit configured to support a rotating component relative to a stationary component and having a first stationary bearing ring configured to be connected to a stationary component by a bearing carrier in a rotationally fixed manner and a second rotatable bearing ring configured to be connected to a rotating component. The bearing carrier is formed from a non-conducting material, and the bearing carrier includes means for electrically connecting the bearing unit to the stationary component.

The bearing assembly disclosed here has the advantage that on the one hand a single preassembled bearing assembly is provided that is made possible by the shaping of the bearing unit in the bearing carrier with an interference-fit and/or friction-fit connection between bearing unit and bearing carrier. On the other hand, an integrated electrically conducting element is additionally provided that provides an electrically conducting contact between bearing unit and stationary component. An easy-to-handle unit of bearing unit and bearing carrier is thereby provided that enables a secure fixing of the bearing unit, a weight reduction, in particular in the case of a bearing carrier made of plastic, and the preventing of current flows through the bearing unit.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
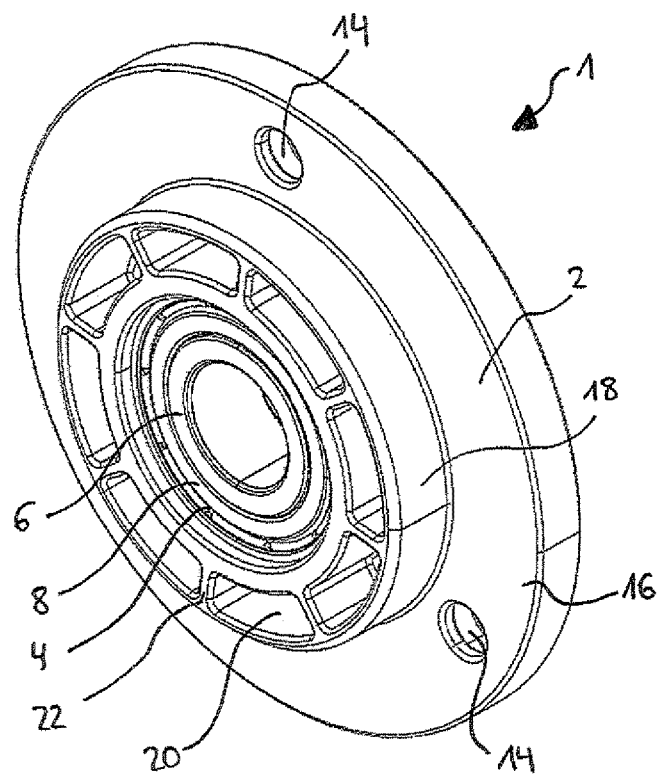
FIG. 1 is a first perspective view of a bearing unit disposed in a bearing carrier.

In the following, identical or functionally equivalent elements are designated by the same reference numbers.

The appended Figures show preferred exemplary embodiments of a bearing assembly 1 including a bearing carrier 2 in which a bearing unit 4 is disposed that includes an inner ring 6 and an outer ring 8. The exemplary embodiments depicted show a bearing assembly 1 that can be used, for example, for the supporting of a shaft in a housing, wherein the housing is stationary and the shaft is rotating. Of course, the bearing assembly 1 is also usable in other applications, for example, a stationary pin and a rotating housing.

The inner ring 6 of the bearing unit 4 is configured as a rotatable bearing ring, and the outer ring 8 is configured as a stationary bearing ring, and connected to the bearing carrier 2. Between the bearing rings 6, 8, rolling elements 10 are disposed that are guided and held uniformly spaced by a cage 12 (see for this purpose in particular FIGS. 3 to 6).

In the exemplary embodiments depicted, the bearing unit 4 is configured as a ball bearing, but all other types of rolling-element bearings are also possible, such as, for example, roller bearings, or plain bearings.

To attach the bearing carrier 2 to the housing 24, the bearing carrier 2 includes a plurality of receptacles, in this case through-openings 14, into which attachment means 26, for example, screws, can be introduced. Other receptacles are also possible, such as, for example, threaded through-stems or separate inserts.

Figure 2:
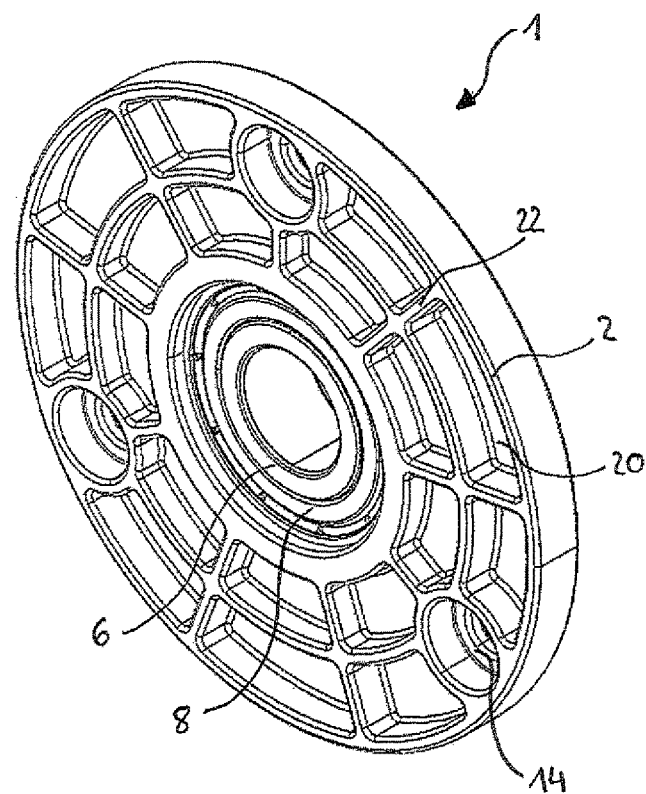
FIG. 2 is a second perspective view of the bearing unit of FIG. 1 disposed in a bearing carrier.

In the exemplary embodiments depicted, the bearing carrier 2 includes a flange 16 including the receptacles 14, and a shoulder 18, in the center of which the bearing unit 4 is disposed. The flange 16 has a certain thickness in order to allow a stable attachment to the housing. As is shown in FIG. 2, the flange 16 includes recesses 20 on one side. These serve to make the bearing carrier 2 lighter, simultaneously keeping it stable due to the remaining bridges 22.

Figure 3:
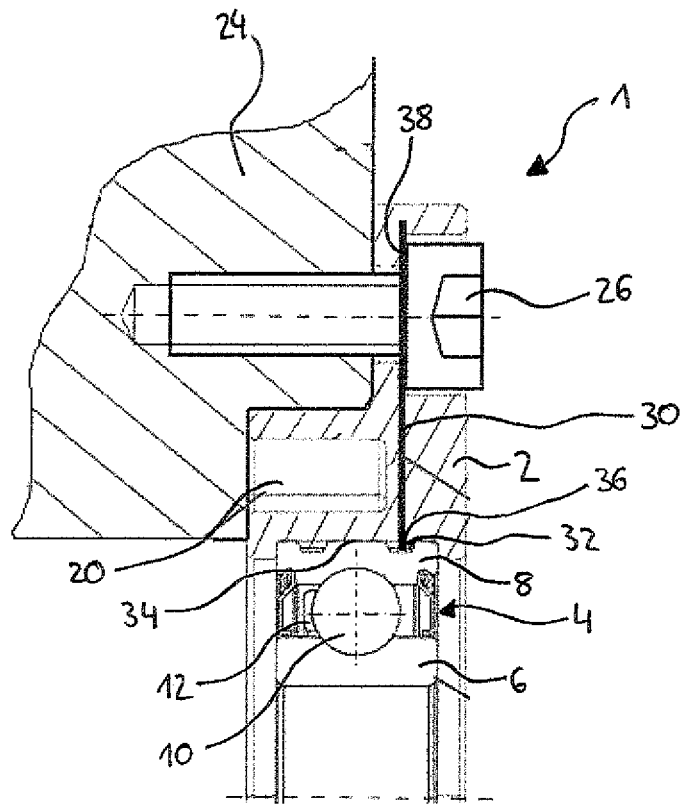
FIG. 3 is a sectional view of a bearing unit disposed in a bearing carrier and an electrically conducting element according to a first embodiment of the disclosure.

In order to allow an electrical shielding or discharging of the bearing unit 4, the bearing carrier 2 includes an electrically conducting element 30, sometimes referred to as an "electrical conductor," as is shown in FIG. 3. In the embodiment shown here, the electrically conducting element 30 has the shape of a disk that makes possible a contact between the bearing unit 4 at the point 36, and the housing 24 at the point 38. Here the contacting between the electrically conducting element 30 and the housing 24 is effected via the attachment means 26, which is also electrically conducting. Due to the contacting between the attachment means 26 and the electrically conducting element 30, an electrically conducting connection is produced between the bearing unit 4, or the bearing ring 8, and the housing 24.

The electrically conducting element 30 is not integrated in the bearing carrier 2 over the entire circumference, but rather can be provided only in one section.

Figure 4:
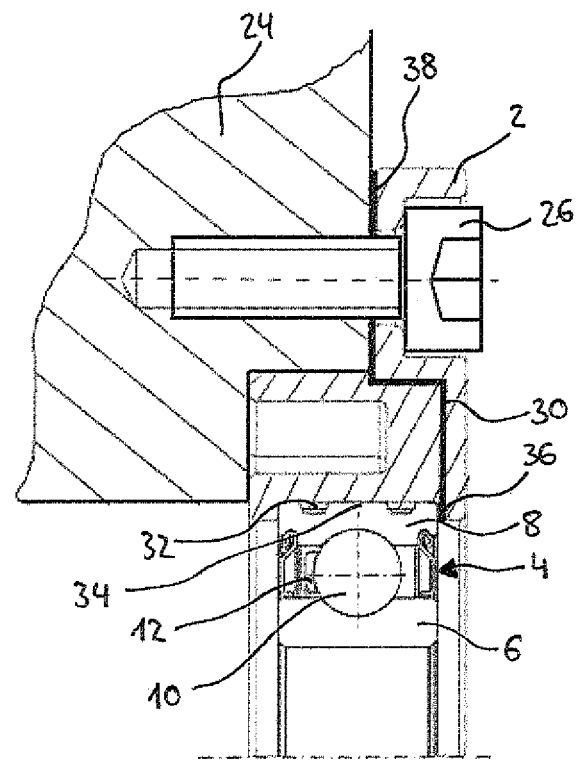
FIG. 4 is a sectional view of a bearing unit disposed in a bearing carrier and an electrically conducting element according to a second embodiment of the disclosure.

In an alternative embodiment that is depicted in FIG. 4, the electrically conducting element 30 is configured step-shaped and provides a direct conducting contact between the bearing unit 4 and the stationary component 20. The electrically conducting element 30 contacts the bearing unit 4 at the point 36 and is then configured step-shaped such that it is guided onto the housing 24. In this way a direct contact of the electrically conducting element 30 with the housing 24 is provided at the point 38. In addition to the direct contacting, an indirect contacting is also effected via the attachment means 26, as is already described in FIG. 3.

Figure 5:
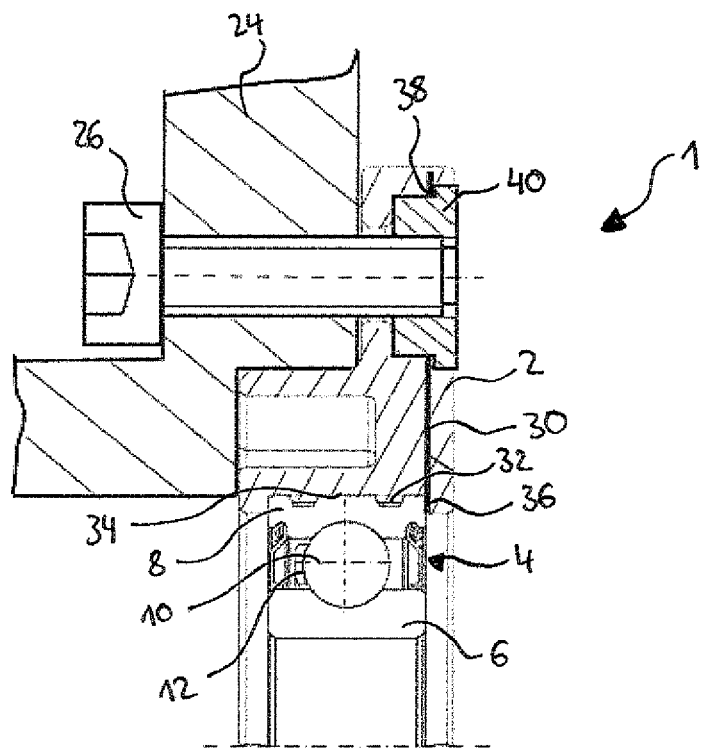
FIG. 5 is a sectional view of a bearing unit disposed in a bearing carrier and an electrically conducting element according to a third embodiment of the disclosure.

In turn according to another embodiment that is depicted in FIG. 5, wherein the electrically conducting element 30 again has the shape of a disk, a contacting is effected between the bearing unit 4 and the housing 24 via a threaded insert 40. As is shown here, the bearing carrier 2 and the housing 24 are not connected to each other from the side of the bearing carrier 2, but rather from an opposite side of the housing 24. Therefore a threaded insert 40 is integrated in the bearing carrier 2 on the side of the bearing carrier 2, which threaded insert 40 represents a nut for the attachment means 26. In this case the contact between the bearing unit 4 and the housing 24 is effected from the contact point 36 between the bearing unit 4 and the electrically conducting element 30 via the electrically conducting element 30 up to a contact point 38 between the electrically conducting element 30 and the threaded insert 40, which in turn provides, via the attachment means 26, the electrical contact with the housing 24.

Figure 6:
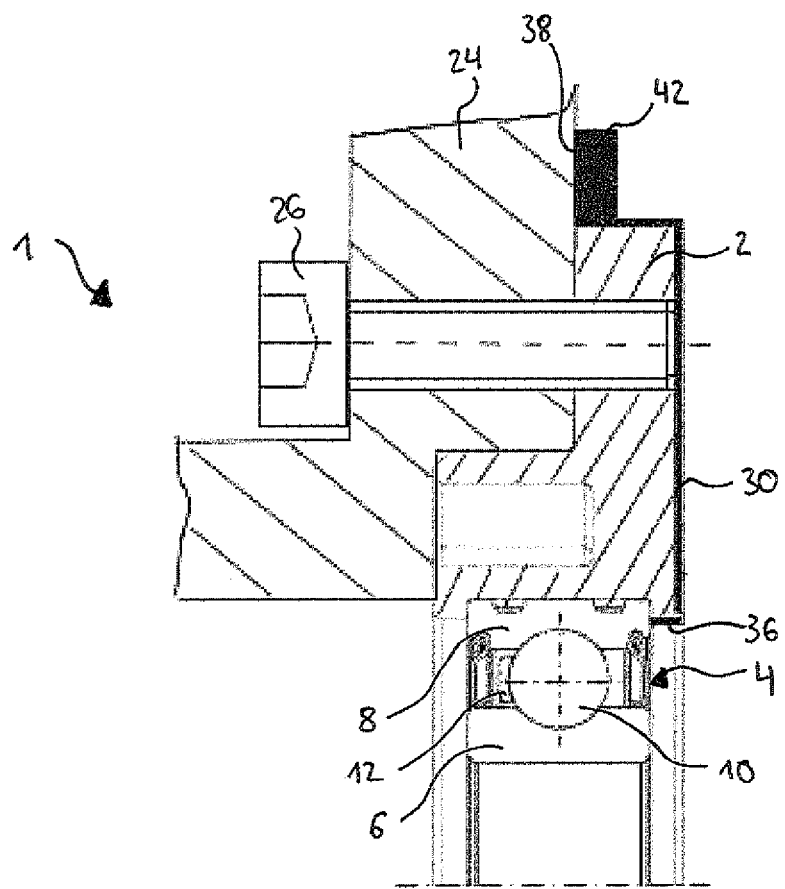
FIG. 6 is a sectional view of a bearing unit disposed in a bearing carrier and an electrically conducting element according to a fourth embodiment of the disclosure.

In turn in another embodiment that is depicted in FIG. 6, the electrically conducting element 30 can be applied onto an outer surface of the bearing carrier 2. This can be effected, for example, by vapor deposition, adhesion, spraying, etc. Here the electrically conducting element 30 also contacts the bearing unit 4 at the point 36 and then leads outwardly along against the bearing carrier 2 up to the housing 24. The contacting is effected here via a contact element 42 that forms the contact point 38 with the housing 24. Alternatively the contact element 42 can be omitted, and the contacting be effected only via the electrically conducting element 30 in the form of a thin layer.

Due to the bearing assembly described herein, on the one hand a bearing assembly is provided preassembled and simple to attach to the housing, which bearing assembly is light and makes possible an electrical discharging or grounding via the housing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing carriers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Bearing carrier
4 Bearing unit
6 Inner ring
8 Outer ring
10 Rolling element
12 Cage
14 Receptacles
16 Flange
18 Shoulder
20 Recesses
22 Bridges
24 Housing
26 Attachment element
30 Electrically conducting element
32 Axial securing elements
34 Contact surface
36, 38 Contact points
40 Thread insert
42 Contact element

What is claimed is:

1. A bearing assembly comprising:
a bearing unit configured to support a rotating component relative to a stationary component and including a bearing carrier, a stationary bearing ring configured to be connected to the stationary component in a rotationally fixed manner by the bearing carrier and a rotatable bearing ring configured to be connected to the rotating component,
an electrical conductor having a first portion at least partially embedded in the bearing carrier, the electrical conductor being in electrical contact with the stationary bearing ring, and
a conductive mechanical connector extending through the first portion and being configured to physically contact the stationary component and maintain an electrical connection between the stationary bearing ring and the stationary component,
wherein the conductive mechanical connector comprises a threaded shaft and a head or threaded insert at one end of the threaded shaft, the head or threaded insert having a peripheral surface and a stop surface between the peripheral surface and the shaft, and
wherein the stop surface physically contacts the electrical conductor.

2. The bearing assembly according to claim 1, wherein the bearing carrier is formed from a non-conducting material.

3. The bearing assembly according to claim 2, wherein the non-conducting material is a thermoplastic.

4. The bearing assembly according to claim 2, wherein the non-conducting material is a thermoset.

5. The bearing assembly according to claim 2, wherein the electrical conductor comprises a metal-fiber reinforced electrical conductor or a carbon-fiber reinforced electrical conductor.

6. The bearing assembly according to claim 2, wherein the electrical conductor is comprised of a film or a metal plate.

7. The bearing assembly according to claim 2, wherein the electrical conductor is not formed over the entire circumference of the bearing carrier.

8. The bearing assembly according to claim 2, wherein the head or threaded insert comprises the threaded insert.

9. The bearing assembly according to claim 2, wherein the head or threaded insert comprises the head.

10. A bearing assembly comprising:
a bearing unit configured to support a rotating component relative to a stationary component and including a bearing carrier, a stationary bearing ring configured to be connected to the stationary component in a rotationally fixed manner by the bearing carrier and a rotatable bearing ring configured to be connected to a rotating component,
an electrical conductor having a first portion at least partially embedded in the bearing carrier, the electrical conductor being in electrical contact with the stationary bearing ring,
a conductive mechanical connector extending through the first portion and being configured to physically contact the stationary component and maintain an electrical connection between the stationary bearing ring and the stationary component,
wherein the bearing carrier is formed from a non-conducting material, and
wherein the electrical conductor includes a second non-embedded portion configured to electrically and physically contact the stationary component.

11. A bearing assembly comprising:
a bearing unit configured to support a rotating component relative to a stationary component and including a bearing carrier, a stationary bearing ring configured to be connected to the stationary component in a rotationally fixed manner by the bearing carrier and a rotatable bearing ring configured to be connected to the rotating component, and
an electrical conductor having a first portion overlying a radially inner surface of the bearing carrier, a second portion overlying a first axially outer side of the bearing carrier and a third portion overlying a radially outer side of the bearing carrier,
wherein the first portion electrically contacts the stationary bearing ring and the third portion is configured to physically contact the stationary component when the bearing carrier is mounted to the stationary component.

12. The bearing assembly according to claim 11,
wherein the stationary bearing ring is an outer bearing ring at least partially mounted in an opening in the bearing carrier, and
wherein a second axially outer side of the bearing carrier is configured to contact the stationary component.

* * * * *